E. L. MILLER.
Corn-Planter.
No. 2,047.  Patented Apr. 10, 1841.
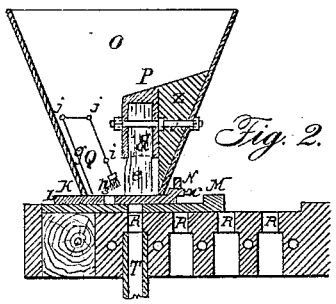
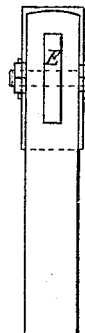
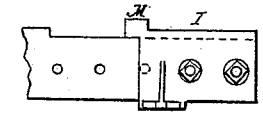
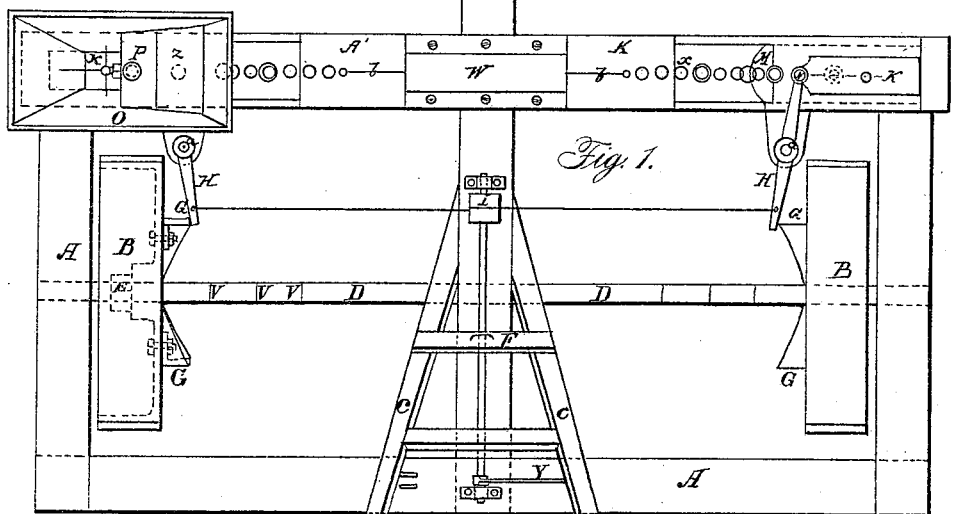
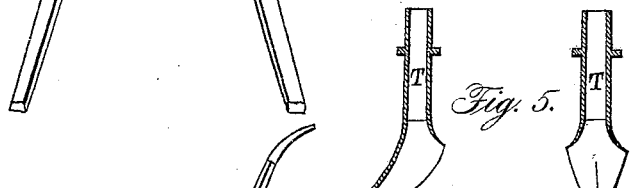
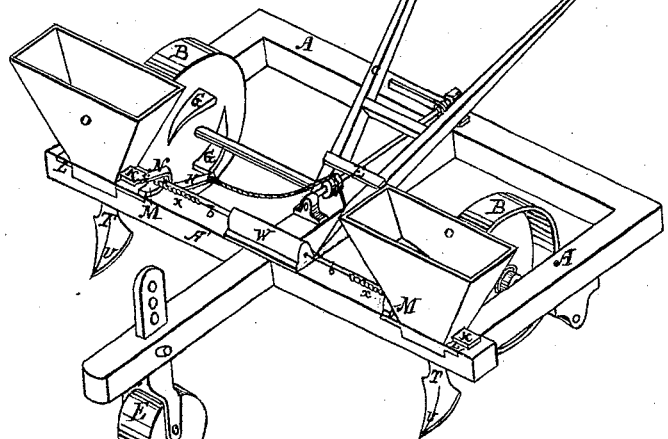
Witnesses:  Inventor:

UNITED STATES PATENT OFFICE.

EZRA L. MILLER, OF BROOKLYN, NEW YORK.

IMPROVEMENT IN MACHINES FOR PLANTING CORN AND OTHER SEEDS.

Specification forming part of Letters Patent No. 2,047, dated April 10, 1841.

*To all whom it may concern:*

Be it known that I, EZRA L. MILLER, of the city of Brooklyn, in the county of Kings and State of New York, have invented certain new and useful improvements in machines for planting corn, sugar-beets, and other seeds which require to be planted at regular distances; and I do hereby declare that the following is a full and exact description thereof.

My machine resembles in many respects some which have been previously known and used; but I have made therein certain improvements by which it is rendered more efficient than any other for the same purpose of which I have any knowledge.

In the accompanying drawings, Figure 6 is a perspective view of my machine; Fig. 1, a top view thereof with one of the hoppers removed; Fig. 2, a longitudinal section through one of the hoppers and its immediate appendages. Figs. 3, 4, and 5 show certain parts in detail; and in all these figures like parts are designated by the same letters of reference.

The frame of the machine, A A, I generally make of wood, although it may, if desired, be constructed of metal. It is supported upon three wheels, B, B, and E. The two wheels B B are affixed to the main shaft D, upon which, however, they are made adjustable, so that their distance from each other may be varied. The fore wheel, E, is also made adjustable vertically, and by this adjustment the depth of the furrow may be readily regulated. C C are the handles for guiding the machine.

When this machine is intended for planting two rows at the same time, as represented in the drawings, the frame should be about four feet by two. The center piece, which supports the regulating-wheel E, should extend two or three feet in front of the general frame. It may be made to plant a single row only, and the frame will then of course be made smaller. In describing it, however, I shall confine myself to the machine as represented for planting two rows.

Upon the front timber, A', of the frame I place two hoppers, O O, for containing the seed. These may be formed of wood or of metal. For corn and other seeds of the larger kind the bottom of this hopper should be about two inches wide and four or five inches long. A slide, K, to which a reciprocating motion is to be communicated by means to be presently described, forms the bottom of each hopper, and this slide has a hole, S, through it, by the diameter of which and the thickness of the slide the seed is measured. Suitable openings are of course made in the lower part of the two ends of the hopper to receive and guide the thickest slide which it is intended to use.

L is a bed-plate upon which the slide works, and through a perforation in which the seed is to pass from the measurer S into one of the sockets or openings R, and thence into the hollow or tubular shafts T of the shares U.

The hoppers are made to shift upon the bar A', the respective sockets R R and the marks V V upon the shaft D indicating the scale of distances to which the said hoppers and wheels may be shifted so as to correspond with each other.

The wheels B B are to have a tread of three or four inches in width for the purpose of pressing the earth upon the seed, and they may be of any convenient diameter. From these wheels the slides receive their reciprocating motion, for which purpose said wheels have inclined planes or cams G G upon their sides, and these, as the wheels revolve, are brought into contact with the levers H H, working on fulcra $a$ $a$, and attached at their outer ends to the slides K, which are consequently forced under the hopper by their action. The slides are drawn out by the action of a spiral spring or springs within the case W, connected to the slides by the rods $b$ $b$ and the links X X, which hook into $c$, Fig. 2, at the end of the slide.

N represents the pin by which the levers H and the slides are connected, the inner ends of said levers working on these pins.

M is a stop or shoulder upon the bed-plate L, against which the ends of the slides strike with great force by the action of the spiral spring as the levers H are liberated from the action of the cam, by which blow a vibratory action is given to the slide, which insures the falling of the seed from the measurer S into the tubular shaft of the share, thus preventing a failure in this particular, which is very apt to occur in other planting-machines. Combined with this part of the apparatus is another important improvement for insuring regular and perfect action in the feeding and delivery of the seed, which improvement I have denominated the "spring-strike." By its aid the superfluous seed is removed from the measurer S in the slide, and that without the danger of jamming or bruising the seed. I construct the spring-strike by taking good elastic quills, which I divide into suitable lengths, cut open, soak, and press flat, so as to be able to place a bundle of them together, and confine one end of them in a suitable box or case, while their other ends project out, as shown in Figs. 2 and 3 in the drawings, where P is the case in which the quills *d e* are contained. This box is confined within the hopper by a bolt, *f*, passing through it and through the block or packing Z, so that the outer ends, *e*, of the quills may be in contact with the slide K. The bolt *f* is confined in place by a screw-nut, and passes through a slot in the hopper, admitting of the adjustment of the strike to the thickness of the slide.

It not unfrequently happens that the seed contained in the hoppers of planting-machines, especially when of a light kind—such as beet-seed—forms a kind of arch by the pressure of one against the other, and their regularly falling into the feeding-openings is thus prevented. To obviate this difficulty I use what I denominate an "agitator," and this I construct in the following way:

*g*, Fig. 2, is a standard or rod attached by its lower end to the slide K, and Q is a rod having a brush or other similar appendage, *h*, at its lower end. The rod Q works on a joint-pin at *i*, and is connected to *g* by a rod working on joint-pins at *j j;* and it will be seen that by this arrangement, as the slide K is moved backward and forward, the rod *g* being attached to it and the joint-pin *i* to the hopper, the lower part of the agitator will be kept in action and insure the falling of the seed into the opening S, which it does more effectually than the revolving brushes, or any other device heretofore essayed for that purpose.

Having thus fully described the manner in which I construct my machine for planting seeds of various kinds, what I claim therein as constituting my invention, and desire to secure by Letters Patent, is—

1. The manner in which I have combined the reciprocating slide K, the stop M, the cams on the wheels, and the spring or springs by which the slides are operated, by means of which combination an alternately slow and rapid motion is given to the reciprocating slides, by the sudden arresting of which against the stop a concussion is produced when the seed-vessel is directly over the dropping-tube, which insures its falling.

2. The particular construction of the spring-strike, formed of elastic quills, and affixed and operating substantially in the manner and for the purpose set forth.

3. The manner of constructing and operating the agitator, as herein described.

E. L. MILLER.

Witnesses:
  THOS. P. JONES,
  B. K. MORSELL.